(12) United States Patent
Yamashita

(10) Patent No.: US 11,128,775 B2
(45) Date of Patent: Sep. 21, 2021

(54) META INFORMATION TRANSMISSION SYSTEM THROUGH PRINTED MATTER, PRINTING CONTROL APPARATUS, PRINTED MATTER READING APPARATUS, METHOD FOR APPLYING META INFORMATION FOR PRINTED MATTER, AND METHOD FOR ACQUIRING META INFORMATION FROM PRINTED MATTER

(71) Applicant: WingArc1st Inc., Tokyo (JP)

(72) Inventor: Naoto Yamashita, Tokyo (JP)

(73) Assignee: WingArc1st Inc., Tokyo (JP)

( * ) Notice: Subject to any disclaimer, the term of this patent is extended or adjusted under 35 U.S.C. 154(b) by 0 days.

(21) Appl. No.: 16/815,459

(22) Filed: Mar. 11, 2020

(65) Prior Publication Data

US 2020/0304671 A1 Sep. 24, 2020

(30) Foreign Application Priority Data

Mar. 19, 2019 (JP) .............................. JP2019-050600

(51) Int. Cl.
*H04N 1/00* (2006.01)
*G06F 3/12* (2006.01)

(52) U.S. Cl.
CPC ....... *H04N 1/00806* (2013.01); *G06F 3/1206* (2013.01); *G06F 3/1225* (2013.01); *H04N 2201/0094* (2013.01)

(58) Field of Classification Search
CPC ........ H04N 1/00806; H04N 2201/0094; G06F 3/1206; G06F 3/1225
USPC ...................................................... 358/1.11
See application file for complete search history.

(56) References Cited

U.S. PATENT DOCUMENTS

| 2003/0002063 | A1* | 1/2003 | Oomura | ................ | G06F 40/109 |
| | | | | | 358/1.11 |
| 2005/0198069 | A1* | 9/2005 | Cherry | .................. | G06F 3/1288 |
| 2006/0274343 | A1* | 12/2006 | Kennis | .................. | G06F 3/1225 |
| | | | | | 358/1.11 |
| 2007/0176804 | A1* | 8/2007 | Abe | ....................... | G06F 40/103 |
| | | | | | 341/84 |
| 2018/0239564 | A1* | 8/2018 | Nakamura | ............ | G06F 3/1254 |

FOREIGN PATENT DOCUMENTS

JP  H08-179789 A  7/1996

* cited by examiner

*Primary Examiner* — Allen H Nguyen
(74) *Attorney, Agent, or Firm* — Polsinelli PC

(57) ABSTRACT

Provided are a printing control unit that performs control so that printing is performed in a state in which character shape deformation is made in association with meta information that is meta information acquired on the basis of print data and indicates meaning of characters, and a digitalization unit that generates meta information corresponding to character shape deformation of characters when generating digital data including character data by inputting a read image of a printed matter to generate digital data including meta information in addition to the character data. The meta information is embedded in the printed matter in an aspect of character shape deformation of characters, and when generating digital data by reading the printed matter, the character shape deformation is recognized to generate meta information corresponding to the deformation. According to this, it is possible to perform retrieval of information using the meta information and the character data.

18 Claims, 4 Drawing Sheets

FORM DATA

PRINTED MATTER

META INFORMATION TRANSMISSION SYSTEM THROUGH PRINTED MATTER, PRINTING CONTROL APPARATUS, PRINTED MATTER READING APPARATUS, METHOD FOR APPLYING META INFORMATION FOR PRINTED MATTER, AND METHOD FOR ACQUIRING META INFORMATION FROM PRINTED MATTER

CROSS REFERENCE TO RELATED APPLICATIONS

This application claims priority to Application No. 2019-050600 filed in Japan on Mar. 19, 2019. The entire contents of each application are hereby incorporated by reference.

BACKGROUND OF THE INVENTION

Field of the Invention

The present invention relates to a meta information transmission system through a printed matter, a printing control apparatus, a printed matter reading apparatus, a method for applying meta information for the printed matter, and a method for acquiring meta information from the printed matter which are suitable to be used for, particularly, a transmission system that transmits meta information indicating meaning of information recorded on the printed matter.

Description of the Related Art

In general, as means for transmitting various pieces of information, a printed matter has been widely used. The printed matter is configured to transmit some pieces of information from an arbitrary person (provider) to a person (receiver), and represents a configuration in which characters, figures, images, or the like which indicate information to be transmitted are recorded (printed) on a paper medium. Information transmission using the printed matter is basically performed through visual observation of a person who receives the printed matter. That is, the receiver visually observes the information recorded on the printed matter and analyzes the meaning thereof.

In a case where a person (receiver) desires to obtain some pieces of information from the printed matter, first, it is necessary to find the printed matter on which desired information is recorded. Finding of the target printed matter is basically performed through visual observation. In a case where the person clearly remembers that the desired information is recorded at which position of which page of the printed matter, there is no problem, but in the opposite case, it is necessary to take considerable effort to find the desired printed matter. In some cases, it may be difficult to find the desired printed matter.

Therefore, various studies have been made to efficiently find the printed matter on which the desired information is recorded, or to efficiently obtain desired information in a plurality of the printed matters. As one of the studies, an information technology (IT) is utilized. For example, it has been performed that characters recorded on the printed matter are read with an image scanner or a digital camera and are converted into digital character codes capable of being used by a computer by using a technology called optical character recognition (OCR) so as to enable the computer to retrieve desired information.

However, even in an aspect in which the information recorded on the printed matter is digitalized into data form capable being used by a computer, there is a problem that a user may not instantly (efficiently) access desired information. The reason for this is as follows.

In the OCR, characters recorded on the printed matter are simply converted into character codes, and the meaning of information of characters or a character line represented by the character codes is not specified. Therefore, in a case where a plurality of character code strings same to one another exist in data that is digitalized from the printed matter, it is difficult for a computer to identify the character code strings as information having different meanings or information having the same meaning.

For example, with regard to a numerical value of "500" recorded on the printed matter, even in a case where a person who visually observes the printed matter can easily analyze that the numerical value represents "fixed price" of a product from surrounding information, the meaning of the numerical value of "500" that is character-encoded by the OCR is not particularly specified, and thus a computer cannot recognize that the character code is a numeral value representing the fixed price of a product.

Therefore, for example, "500" as a numerical value indicating the "fixed price" of a product, "500" as a numerical value indicating "selling price" of another product, "500" as a numerical value indicating "stock amount" of a product, and the like exist together, even in a case where a user desires to obtain information relating to a product with a fixed price of 500 yen, when inputting a numerical value of "500" as a retrieval key, in addition to "500" as the fixed price, "500" as the selling price and "500" as the stock amount are also extracted by the retrieval. In this case, it is necessary for a user to confirm whether or not a plurality of kinds of retrieved "500" is information relating to the target fixed price while confirming sites at which the plurality of kinds of retrieved "500" are described one by one. As described above, even when executing retrieval by using data that is digitalized by OCR from the printed matter, it is difficult to instantly (or efficiently) access the desired information.

Note that, in order for voice information added to a character line to be intuitively and easily recognized, there is known a technology in which individual character fonts for printing character line data are applied with color information and are subjected to deformation on the basis of voice information correlated with the character line data (for example, refer to JP-A-8-179789).

The invention has been made to solve the above-described problems, and an object thereof is to enable efficient access to desired information by using digital data including a conversion result of characters recorded on a printed matter into digital character data.

SUMMARY OF THE INVENTION

To accomplish the above-described object, according to an aspect of the invention, there is provided a meta information transmission system through a printed matter. The meta information transmission system includes: a printing control unit that performs control relating to execution of printing by using print data that includes at least character data; a read image input unit that inputs a read image of a printed matter created by printing based on control by the printing control unit, and a digitalization unit that generates digital data including character data corresponding to characters recorded on the printed matter on the basis of the read image. Here, the printing control unit performs control so that printing is performed in a state in which deformation is made with respect to a character shape expressed by a designation font in association with meta information that is meta information acquired on the basis of the print data and indicates meaning of characters expressed by the character data. In addition, when converting the characters recorded on the printed matter into digital character data, the digitalization unit recognizes character shape deformation with respect to the characters recorded on the printed matter, and generates meta information corresponding to the recognized deformation with reference to deformation related information stored in a state in which a content of the character shape deformation and a content of the meta information are associated with each other to generate digital data including the character data and the meta information.

According to the invention configured as described above, the meta information is embedded in the printed matter in an aspect of character shape deformation of printed characters, and when generating digital data including character data by reading the printed matter, the character shape deformation of the printed characters is recognized and meta information corresponding to the character shape deformation is generated. Accordingly, information retrieval using the meta information and character data becomes possible. As a result, it is possible to efficiently access desired information by using digital data including a conversion result of characters recorded on the printed matter into the digital character data.

DETAILED DESCRIPTION OF THE INVENTION

First Embodiment

Figure 1:
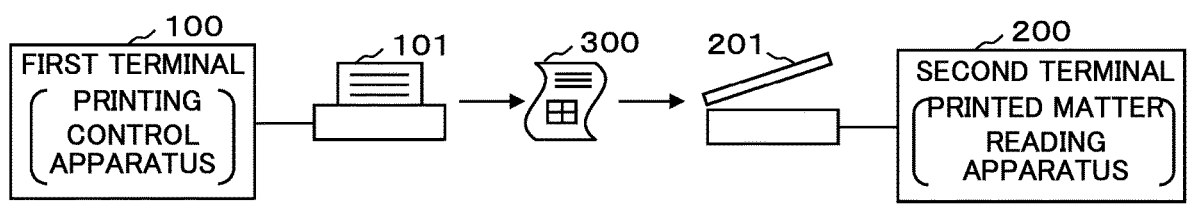
FIG. 1 is a view illustrating a hardware configuration example of a meta information transmission system through a printed matter according to a first embodiment.

Hereinafter, a first embodiment of the invention will be described with reference to the accompanying drawings. FIG. 1 is a view illustrating a hardware configuration example of a meta information transmission system through a printed matter (hereinafter, simply referred to as "meta information transmission system") according to a first embodiment. As illustrated in FIG. 1, the meta information transmission system according to the first embodiment includes a first terminal 100, a printer 101 that is connected to the first terminal 100, a second terminal 200, and an image scanner 201 that is connected to the second terminal 200.

The first terminal 100 includes a printing control apparatus of the invention, and examples thereof include a pc, a tablet terminal, a smartphone, a point of sales (POS) terminal, and the like. The first terminal 100 controls execution of printing with respect to the printer 101 by using print data that is used in printing.

The printer 101 executes printing in accordance with a print command transmitted from the first terminal 100 in combination with the print data, and outputs a printed matter 300 that is a paper medium. In this embodiment, meta information is included in the print data, and the first terminal 100 and the printer 101 generate the printed matter 300 in a state in which the meta information is embedded in the printed matter 300. Details thereof will be described later.

The image scanner 201 optically reads the printed matter 300, and outputs a reading image to the second terminal 200. Note that, a digital camera may be used instead of the image scanner 201. In addition, any apparatus may be used as long as the contents of the printed matter 300 may be substituted with image data.

The second terminal 200 includes a printed matter reading apparatus of the invention, and examples thereof include a pc, a tablet terminal, a smartphone, and the like. In a case where the second terminal 200 is constituted by the smartphone, a digital camera provided in the smartphone may be used instead of the image scanner 201. The second terminal 200 inputs a read image from the image scanner 201, and converts a character image included in the image into digital character data (character code) to generate digital data. At this time, the second terminal 200 reproduces meta information embedded in the printed matter 300, and generates digital data including the character data and the meta information. Details thereof will also be described later.

Note that, here, the first terminal 100 and the second terminal 200 are described as different terminals, but may be the same as each other. That is, for example, the printer 101 and the image scanner 201 may be connected to one pc, and the pc may include functions of the first terminal 100 and the second terminal 200.

Figure 2:
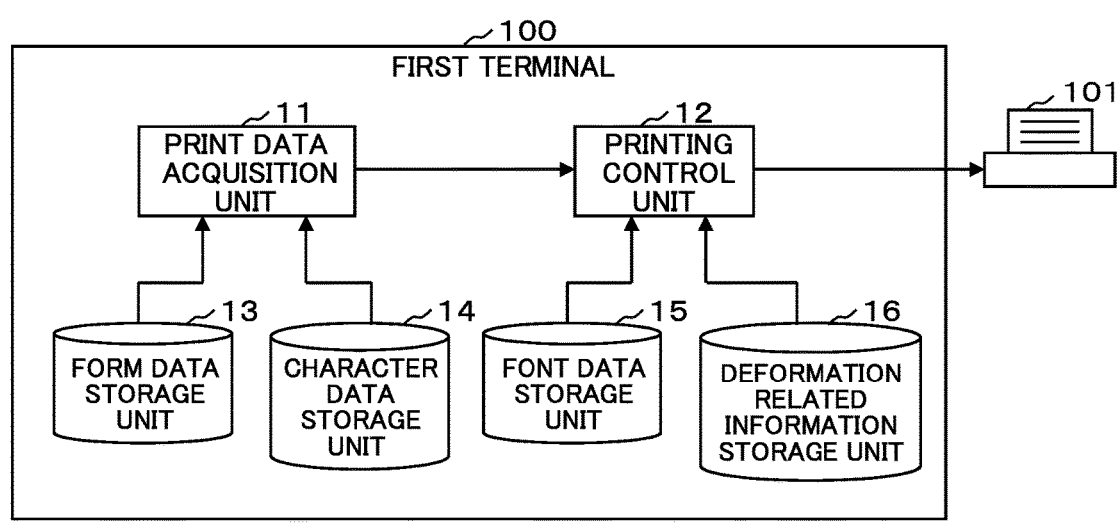
FIG. 2 is a block diagram illustrating a functional configuration example of a first terminal according to the first embodiment.

FIG. 2 is a block diagram illustrating a functional configuration example of the first terminal 100 according to the first embodiment. As illustrated in FIG. 2, the first terminal 100 includes a print data acquisition unit 11 and a printing control unit 12 as a functional configuration. In addition, the first terminal 100 includes a form data storage unit 13, a character data storage unit 14, a font data storage unit 15, and a deformation related information storage unit 16 as a storage medium. Note that, the storage units 13 to 16 are illustrated in the drawing in a state of being classified into four units for convenience of description, but this does not intend that information should be stored in a state of being physically distributed to the four storage media, and the information may be stored in one storage medium.

The print data acquisition unit 11 and the printing control unit 12 may be constituted by any of hardware, a digital signal processor (DSP), and software. For example, in the case of being constituted by the software, the print data acquisition unit 11 and the printing control unit 12 actually include a CPU, a RAM, a ROM, and the like of a computer, and are realized when a program stored in a recording medium such as a the RAM, the ROM, a hard disk, and a semiconductor memory operates.

The print data acquisition unit 11 acquires print data including at least character data. In this embodiment, the print data is variable print data including form data relating to a print form, and character data embedded in the print form, and the print data acquisition unit 11 acquires the form data from the form data storage unit 13, and acquires the character data from the character data storage unit 14.

The form data storage unit 13 stores the form data relating to the print form. The form data is configured to define a print form that defines which information is to be printed at which position of the printed matter 300, and includes character data relating to characters (representing Hiragana, Katakana, Chinese characters, alphabets, numbers, symbols, and the like which are expressed by character codes), non-character data relating to a figure, a ruled line, an image, and the like (which cannot expressed by character codes), and data relating to a field into which the character data acquired from the character data storage unit 14 is inserted.

The data relating to the field (hereinafter, referred to as "field data") includes layout information indicating a position and a size of each field in the printed matter 300, link information for association of character data to be inserted into the field, print attribute information indicating a type or a character size of a font, a type of character decoration or the like that is used when performing printing on the basis of the character data (character data associated by the link information) to be inserted into the field, and meta information indicating meaning of characters expressed by the character data to be inserted into the field. For example, the meaning of the characters includes whether the characters represent a fixed price of a product, whether the characters represent a selling price of a product, or whether the characters represent a stock amount of a product.

The character data storage unit 14 stores character data to be inserted into one or more fields provided in a print form. The character data stored in the character data storage unit 14 may be any data if it can be specified by link information of the field data, and a data format or a file format does not matter. For example, data in a spreadsheet format or a relational database (RDB) format, which includes characters in the contents thereof, may be used as the character data. The spreadsheet or RDB in this case may include non-character data other than the character data.

The printing control unit 12 performs control relating to execution of printing with respect to the printer 101 by using the print data acquired by the print data acquisition unit 11. When performing printing on the basis of the character data (character data inserted into a field of a print form) included in the print data, the printing control unit 12 performs control so that printing is performed in a state in which deformation is made with respect to a character shape expressed by a designation font in association with the meta information included in the print data.

That is, when performing printing by inserting the character data into one or more fields provided in the print form, the printing control unit 12 performs control so that printing is performed in a state in which deformation is made with respect to the character shape expressed by a designation font with respect to the character data inserted into the one or more fields in association with the meta information provided in the form data in correspondence with each of the one or more fields. The designation font is a font designated by print attribute information. In addition, examples of the character shape deformation include image displacements such as italicization, bolding, rotation, shearing, and local enlargement or reduction in a character shape. It is assumed that the character shape deformation is minute deformation in a certain extent that is not easily recognized for a person who visually observes the printed matter 300.

The printing control unit 12 executes printing by using font data relating to a designation font in a plurality of kinds of font data stored in the font data storage unit 15. At this time, the printing control unit 12 performs control to make a predetermined deformation with respect to the character shape expressed by the designation font in accordance with deformation related information stored in the deformation related information storage unit 16.

The deformation related information storage unit 16 stores in advance the deformation related information composed by associating the content of the meta information and the content of the character shape deformation to be made in correspondence with the content of the meta information. The deformation related information is information in which the content of the meta information and the content of the character shape deformation are associated in advance. For example, in a case where the content of the meta information is "fixed price of a product", the content of the character shape deformation is "right rotation by one degree", in a case where the content of the meta information is "selling price of a product", the content of the meta information is "left rotation by one degree", and in a case where the content of the meta information is "stock amount of a product", the content of the character shape deformation is "italicization in a right direction by one degree".

The deformation related information storage unit 16 may store the deformation related information in which the content of the meta information and the content of the character shape deformation are associated with each other with respect to at least the meta information corresponding to the one or more fields provided in the field data included in the form data stored in the form data storage unit 13. Note that, in a case where the form data storage unit 13 stores a plurality of kinds of the form data, the deformation related information storage unit 16 stores the deformation related information in correspondence with each piece of the form data. In this case, the form data and the deformation related information corresponding to the form data are associated with each other by arbitrary identification information (for example, a form ID).

When performing printing on the basis of the character data inserted into each field of the print form, the printing control unit 12 performs control so that printing is performed in a state in which the character shape deformation associated with the meta information of the field is made with respect to the character shape expressed by a font designated by print attribute information of the field with reference to the deformation related information stored in the deformation related information storage unit 16. For example, the printing control can be performed as follows. Specifically, the printing control unit 12 reads out font data relating to a designation font from the font data storage unit 15, and generates a character image by the designation font. In addition, the printing control unit 12 generates a deformed character image by performing the character shape deformation associated with the meta information with respect to the character image generated as described above. In addition, the printing control unit 12 performs control so that printing is performed by outputting a whole page image including the deformed character image to the printer 101.

A procedure (a meta information application method) executed in the first terminal 100 configured as described above is as follows. First, the print data acquisition unit 11 acquires print data that includes at least character data. Next, the printing control unit 12 outputs the printed matter 300 from the printer 101 by performing control relating to execution of printing with respect to the printer 101 by using the print data acquired by the print data acquisition unit 11. At this time, the printing control unit 12 performs control so that printing is performed in a state in which deformation is made with respect to a character shape expressed by a designation font in accordance with meta information acquired on the basis of the print data.

Figure 3A:
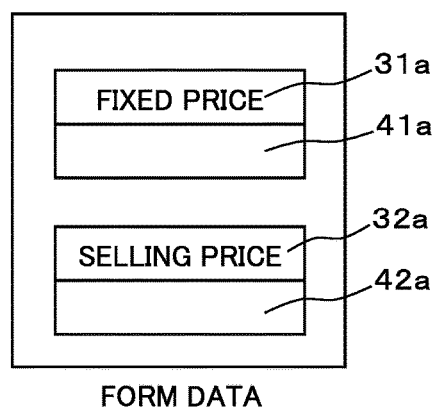
FIGS. 3A and 3B are views illustrating an example of form data and a printed matter.
Figure 3B:
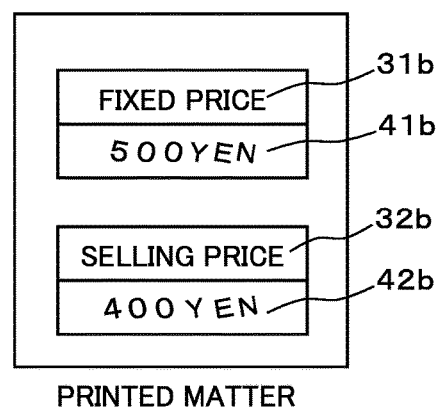

FIGS. 3A and 3B are views illustrating an example of the form data stored in the form data storage unit 13 and the printed matter 300 created by using the form data. Note that, a print form expressed by the form data is simplified and is schematically illustrated for description of main points.

FIG. 3A illustrates the form data. The form data illustrated in FIG. 3A includes character data 31a of "fixed price", a first field 41a disposed immediately below the character data 31a, character data 32a of "selling price", and a second field 42a disposed immediately below the character data 32a. In addition, the character data 31a and the first field 41a are surrounded by a ruled line, and the character data 32a and the second field 42a are surrounded by a ruled line.

The form data includes layout information indicating a position and a size of the first field 41a, link information for association of character data (character data stored in the character data storage unit 14) to be inserted into the first field 41a, print attribute information indicating a kind of a font that is used when performing printing on the basis of the character data to be inserted into the first field 41a, a character size, and the like, and meta information indicating the meaning of characters expressed by the character data to be inserted into the first field 41a. With regard to the first field 41a, the meta information is information indicating the meaning of "fixed price of a product".

In addition, the form data includes layout information indicating a position and a size of the second field 42a, link information for association of character data to be inserted into the second field 42a, print attribute information indicating a kind of a font that is used when performing printing on the basis of the character data to be inserted into the second field 42a, a character size, and the like, and meta information indicating the meaning of characters expressed by the character data to be inserted into the second field 42a. With regard to the second field 42a, the meta information is information indicating the meaning of "selling price of a product".

FIG. 3B illustrates an example of the printed matter 300 that is created by using the form data illustrated in FIG. 3A. As illustrated in FIG. 3B, the printed matter 300 includes a character 31b of "fixed price", a character 41b of "500 yen" disposed immediately below the character 31b, a character 32b of "selling price", and a character 42b of "400 yen" disposed immediately below the character 32b. In addition, the character 31b and the character 41b are surrounded by a ruled line, and the character 32b and the character 42b are surrounded by a ruled line.

The character 41b of "500 yen" indicates a result that is printed in a state in which the character data read out from the character data storage unit 14 is inserted on the basis of the link information of the first field 41a. The character 41b is obtained after the character shape deformation (right rotation by one degree) associated with the meta information of the first field 41a is made with respect to a character shape of a font designated by print attribute information of the first field 41a. Note that, for convenience of description, FIG. 3B illustrates a state in which the character 41b is rotated by an angle greater than an actual rotation angle for understanding of the rotation of the character 41b to the right. Actual character shape deformation is minute deformation to a certain extent that is not easily recognized for a person who visually observes the printed matter 300, and thus the character 41b appears to be hardly rotated for a person.

The character 42b of "400 yen" represents a result that is printed in a state in which character data read out from the character data storage unit 14 is inserted on the basis of the link information of the second field 42a. The character 42b is obtained after the character shape deformation (left rotation by one degree) associated with the meta information of the second field 42a is made with respect to a character shape of a font designated by print attribute information of the second field 42a. Note that, for convenience of description, FIG. 3B illustrates a state in which the character 42b is rotated by an angle greater than an actual rotation angle for understanding of the rotation of the character 42b to the left. Actual character shape deformation is minute deformation to a certain extent that is not easily recognized for a person who visually observes the printed matter 300, and thus the character 42b appears to be hardly rotated for a person.

The person who views the printed matter 300 can recognize that the fixed price of a product is 500 yen because the character 41b of "500 yen" is printed immediately below the character 31b of "fixed price" and is surrounded by a ruled line. Similarly, the person who views the printed matter 300 can recognize that the selling price of a product is 400 yen because the character 42b of "400 yen" is printed immediately below the character 32b of "selling price" and is surrounded by a ruled line.

In addition, in this embodiment, meta information indicating the fixed price of a product is encoded in a format of character shape deformation (right rotation by one degree), and is embedded in the printed matter 300 so as to enable a computer to recognize that the character 41b of "500 yen" represents the fixed price of a product. Similarly, meta information indicating the selling price of a product is encoded in a format of character shape deformation (left rotation by one degree), and is embedded in the printed matter 300 so as to enable a computer to recognize that the character 42b of "400 yen" represents the selling price of a product.

Figure 4:
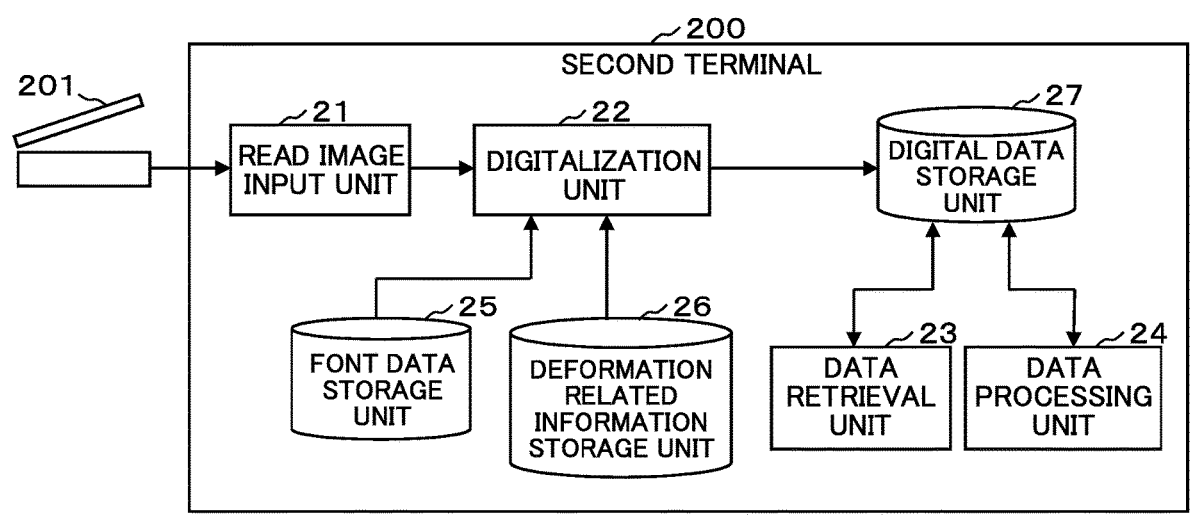
FIG. 4 is a block diagram illustrating a functional configuration example of a second terminal according to the first embodiment.

FIG. 4 is a block diagram illustrating a functional configuration example of the second terminal 200 according to the first embodiment. As illustrated in FIG. 4, the second terminal 200 includes a read image input unit 21, a digitalization unit 22, a data retrieval unit 23, and a data processing unit 24 as a functional configuration. In addition, the second terminal 200 includes a font data storage unit 25, a deformation related information storage unit 26, and a digital data storage unit 27 as a storage medium. Note that, for convenience of description, the storage units 25 to 27 are illustrated in the drawing in a state of being classified into three units, but this does not intend that information should be stored in a state of being physically distributed to the three storage media, and the information may be stored in one storage medium.

The respective functional blocks 21 to 24 may be constituted by any of hardware, a DSP, and software. For example, in the case of being constituted by the software, the respective functional blocks 21 to 24 actually include a CPU, a RAM, a ROM, and the like of a computer, and are realized when a program stored in a recording medium such as a the RAM, the ROM, a hard disk, and a semiconductor memory operates.

The read image input unit 21 inputs a read image of the printed matter 300 created by printing based on control by the printing control unit 12 of the first terminal 100 from the image scanner 201. The digitalization unit 22 generates digital data including character data (character code) corresponding to characters recorded on the printed matter 300. When converting characters recorded on the printed matter 300 into digital character data, the digitalization unit 22 recognizes character shape deformation with respect to characters recorded on the printed matter 300, and generates meta information corresponding to the recognized deformation to generate digital data including the meta information in addition to the character data.

When generating the meta information, the digitalization unit 22 refers to data stored in each of the font data storage unit 25 and the deformation related information storage unit 26. The font data storage unit 25 and the deformation related information storage unit 26 store in advance the same data as the data stored in the font data storage unit 15 and the deformation related information storage unit 16. That is, the digitalization unit 22 compares a character shape of a character image included in the read image that is input by the read image input unit 21 and a character shape of characters expressed by the font data read out from the font data storage unit 25 with each other to recognize the content of character shape deformation with respect to the characters (characters recorded at a position corresponding to each field of a print form) recorded on the printed matter 300. In addition, the digitalization unit 22 refers to deformation related information stored in the deformation related information storage unit 26, and obtains meta information associated with the recognized character shape deformation to generate meta information corresponding to the character shape deformation.

Note that, the font data storage unit 15 and the deformation related information storage unit 16 which are provided in the first terminal 100 may be provided in an external apparatus, and data of the font data storage unit 15 and the deformation related information storage unit 16 may be used by accessing the external apparatus from the first terminal 100 and the second terminal 200 through a communication network such as a local area network (LAN) or the Internet. In this case, the font data storage unit 15 and the deformation related information storage unit 16 can be omitted from the first terminal 100, and the font data storage unit 25 and the deformation related information storage unit 26 can be omitted from the second terminal 200. Note that, only the deformation related information storage unit 16 or 26 may be provided in the external apparatus.

A procedure (a meta information acquisition method) executed in the second terminal 200 configured as described above is as follows. First, the read image input unit 21 inputs a read image of the printed matter 300. Next, the digitalization unit 22 generates digital data including character data corresponding to characters recorded on the printed matter 300 on the basis of the read image input by the read image input unit 21. At this time, the digitalization unit 22 recognizes character shape deformation with respect to the characters recorded on the printed matter 300, and generates meta information corresponding to the recognized deformation to generate digital data including the character data and the meta information.

The digitalization unit 22 stores and retains the generated digital data in the digital data storage unit 27. At this time, the digitalization unit 22 associates the character data obtained by digitalizing the characters recorded at a position corresponding to each field of a print form on the printed matter 300, and the meta information generated by recognizing the character shape deformation of the characters with each other, and stores the character data and the meta information in the digital data storage unit 27. The digital data stored in the digital data storage unit 27 can be used for various purposes.

For example, desired information can be extracted by the data retrieval unit 23 by performing retrieval of the digital data by setting desired characters and desired meaning related to the characters as a retrieval key. For example, when performing retrieval by using a number of "500" and meaning of "fixed price of a product" as a retrieval key, it is possible to extract only information of "500" indicating the fixed price of a product. Even in a case where a number of "500" indicating meaning other than the fixed price of a product is included in the digital data stored in the digital data storage unit 27, the number is not extracted by retrieval and only "500" indicating the fixed price of 500 yen is extracted. According to this, it is possible to efficiently access the desired information by using the digital data including a conversion result of the characters recorded on the printed matter 300 into the digital character data.

Note that, a read image of the printed matter 300 on which desired information is recorded may be retrieved as follows. That is, when the read image input unit 21 inputs the read image, a printed matter ID is applied to the read image. In addition, the read image and digital data generated by the digitalization unit 22 are stored in the digital data storage unit 27 in association with the printed matter ID. According to this, retrieval of the digital data can be performed by setting desired characters and desired meaning as a retrieval key, and a read image corresponding to the digital data in which information that matches the retrieval key is recorded can be extracted.

In addition, when performing data processing by using the digital data stored in the digital data storage unit 27 by the data processing unit 24, new digital data can also be generated. The content of the data processing is arbitrary, but processing that is effective in being performed using the meta information is preferable. For example, statistical processing or analysis processing using characters having meaning indicated by the meta information can be considered as an example.

The data processing unit 24 generates meta information corresponding to character data included in the new digital data by using the meta information included in the digital data. In addition, the data processing unit 24 stores and retains the generated new digital data (including character data generated by the statistical processing or the analysis processing, and meta information corresponding to the character data) in the digital data storage unit 27.

Here, in a case where character data that is a result of data processing using character data of arbitrary meta information is data having the same meaning as meaning indicated by the meta information, meta information corresponding to the character data generated by the data processing is subjected to the same association. For example, with regard to the meta information, in a case where character data that is a result of data processing using character data (number) of "fixed price of a product" is the fixed price of a product (a total value or an average value of the fixed price, or the like), meta information corresponding to character data included in new digital data is also set as "fixed price of a product".

On the other hand, in a case where character data that is a result of data processing using character data of arbitrary meta information is data having meaning different from meaning indicated by the meta information, it is assumed that there is no meta information corresponding to character data generated by data processing. Alternatively, a user who performs data processing may input meta information by operating the second terminal 200 to associate the meta information designated by the user with respect to character data generated by data processing.

Note that, here, it is assumed that the second terminal 200 that performs digitalization of the printed matter 300 includes the data retrieval unit 23 and the data processing unit 24, but the invention is not limited thereto. For example, digital data stored in the digital data storage unit 27 may be stored in a server apparatus (not illustrated), and the server apparatus may include the data retrieval unit 23 and the data processing unit 24. In this case, a processing request is transmitted to the server apparatus from a terminal (may be the first terminal 100, the second terminal 200, or other terminals) connected to the server apparatus through a communication network such as a LAN and the Internet to cause the server apparatus to execute data retrieval or data processing, and the result is transmitted from the server apparatus to the terminal.

The print data acquisition unit 11 of the first terminal 100 may acquire new digital data generated by the data processing unit 24 (digital data stored in the digital data storage unit 27 or digital data stored in the server apparatus as described above) as the print data. The new digital data acquired as described above includes character data generated by data processing, and meta information that is associated with the character data. Accordingly, when performing printing on the basis of the character data, the printing control unit 12 can perform control so that printing is performed in a state in which character shape deformation associated with the meta information is made with reference to the deformation related information storage unit 16.

As described above, in this embodiment, in the case of generating new digital data by data processing using digital data (including character data and meta information) generated by digitalizing the printed matter 300 by OCR, even when performing printing on the basis of the new digital data, meta information indicating meaning of characters recorded on the printed matter 300 may be encoded in an aspect of the character shape deformation, and may be embedded in the printed matter 300. According to this, the meta information indicating the meaning of the characters recorded on the printed matter 300 can be cyclically transmitted.

Figure 5:
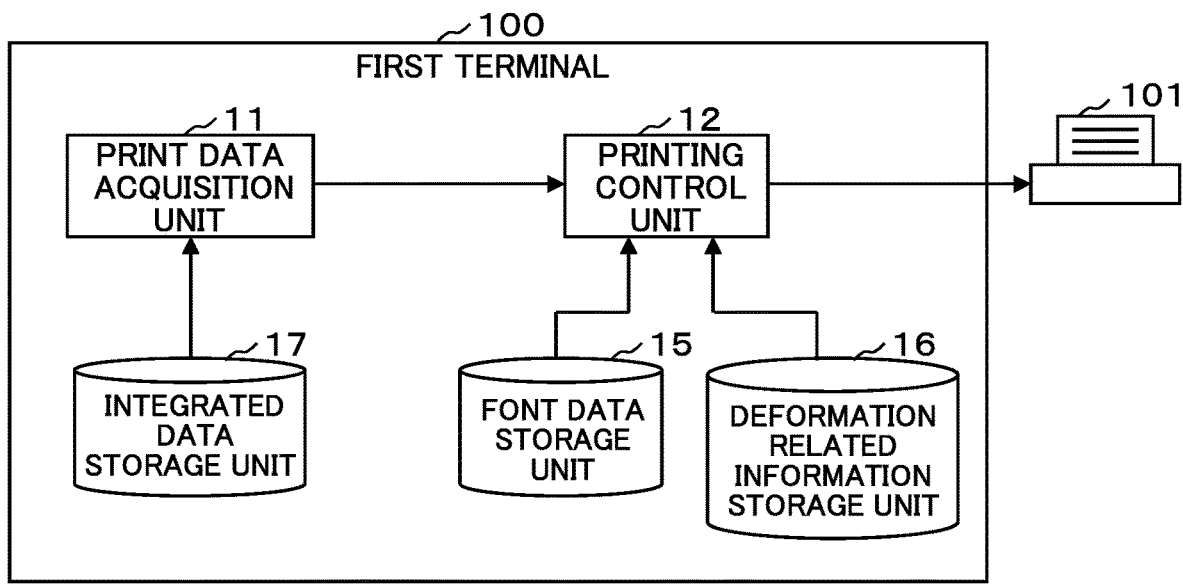
FIG. 5 is a block diagram illustrating another functional configuration example of the first terminal according to the first embodiment.

Note that, in the embodiment, description has been given of an example in which the form data and the character data are used as the print data, but the invention is not limited thereto. For example, as illustrated in FIG. 5, an integrated data storage unit 17 may be provided instead of the form data storage unit 13 and the character data storage unit 14, and integrated data (including meta information as accompanying information) including one or more pieces of character data and another data relating to another information to be printed may be used as the print data. Examples of the integrated data include data created by a document creation application, data created by a spread sheet application, data created by a drawing application, data created by a database application, and the like.

In the case of using the integrated data as the print data, when performing printing on the basis of character data included in the integrated data, the printing control unit 12 performs control so that printing is performed in a state in which deformation (character shape deformation associated with meta information by deformation related information of the deformation related information storage unit 16) is made with respect to a character shape expressed by a designation font for one or more pieces of character data in association with meta information corresponding to the character data.

Here, with regard to correspondence of which meta information with respect to which character data, association is made in advance by a predetermined method. For example, when creating the integrated data by using the above-described application, a user designates desired character data and performs an operation for making an association of desired meta information to make an association between the character data and the meta information. In this case, the meta information is stored in the integrated data storage unit 17 in accompaniment with the integrated data.

Figure 6:
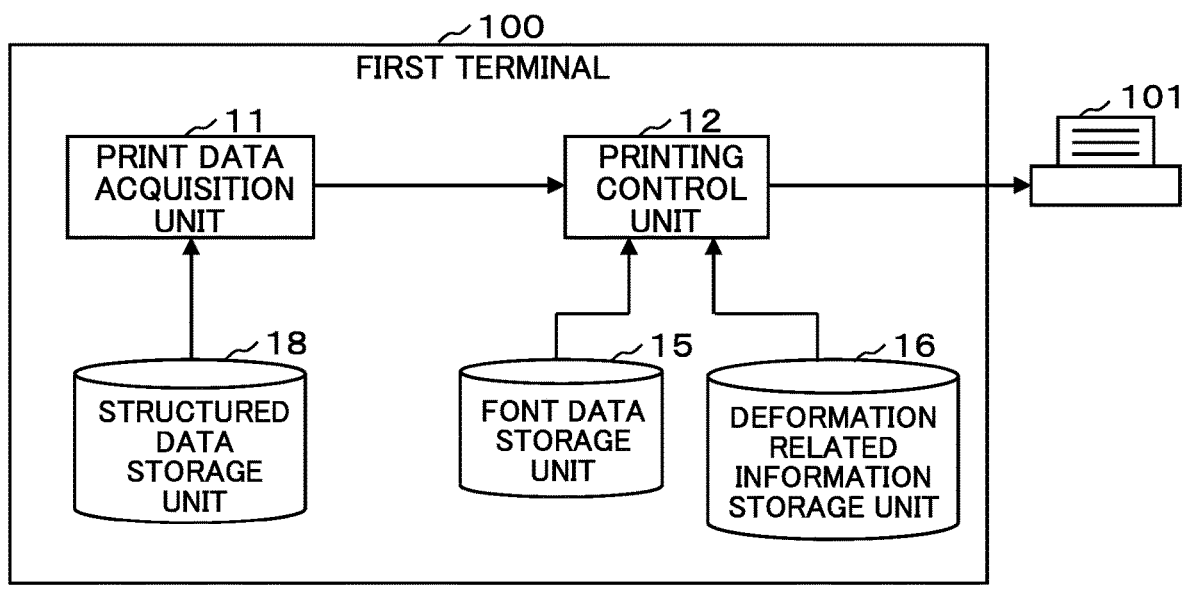
FIG. 6 is a block diagram illustrating still another functional configuration example of the first terminal according to the first embodiment.

As another example, as illustrated in FIG. 6, a structured data storage unit 18 may be provided instead of the form data storage unit 13 and the character data storage unit 14, and structured data may be used as the print data. The structured data is data including a data item corresponding to meta information indicating meaning of characters expressed by character data, and character data equivalent to actual data value corresponding to the data item, and examples thereof include data in a spread sheet format or an RDB format.

In the case of using the structured data as the print data, when performing printing on the basis of the character data included in the structured data, the printing control unit 12 performs control so that printing is performed in a state in which deformation (character shape deformation associated with meta information by deformation relating information of the deformation related information storage unit 16) is made with respect to a character shape expressed by a designation font for one or more pieces of character data pertaining to the data item in association with the meta information indicated by the data item.

As described above, according to the first embodiment, when performing printing on the basis of the print data, the meta information is embedded in the printed matter 300 in an aspect of character shape deformation of print characters, and when creating digital data including character data by reading the printed matter 300, the character shape deformation of the print characters is recognized to generate meta information corresponding to the deformation, and digital data including the character data and the meta information is generated. According to this, it is possible to perform retrieval of information using meta information and character data by using digital data including a conversion result of characters recorded on the printed matter 300 into digital character data, and thus it is possible to efficiently access desired information.

Second Embodiment

Next, a second embodiment of the invention will be described with reference to the accompanying drawings. A hardware configuration of a meta information transmission system according to the second embodiment is the same as in FIG. 1. However, a first terminal 100' having a different function is used instead of the first terminal 100. In addition, a second terminal 200' having a different function is used instead of the second terminal 200.

In the above-described first embodiment, description has been given of an example in which determination as to whether which character shape deformation is to be made with respect to the content of the meta information is made in advance, and the content is stored in the deformation related information storage unit 16. In contrast, a meta information transmission system according to the second embodiment performs arbitrary character shape deformation when performing printing by the first terminal 100', generates deformation related information by associating meta information with the character shape deformation and registers the deformation related information, and enables the second terminal 200' to use the registered deformation related information.

Figure 7:
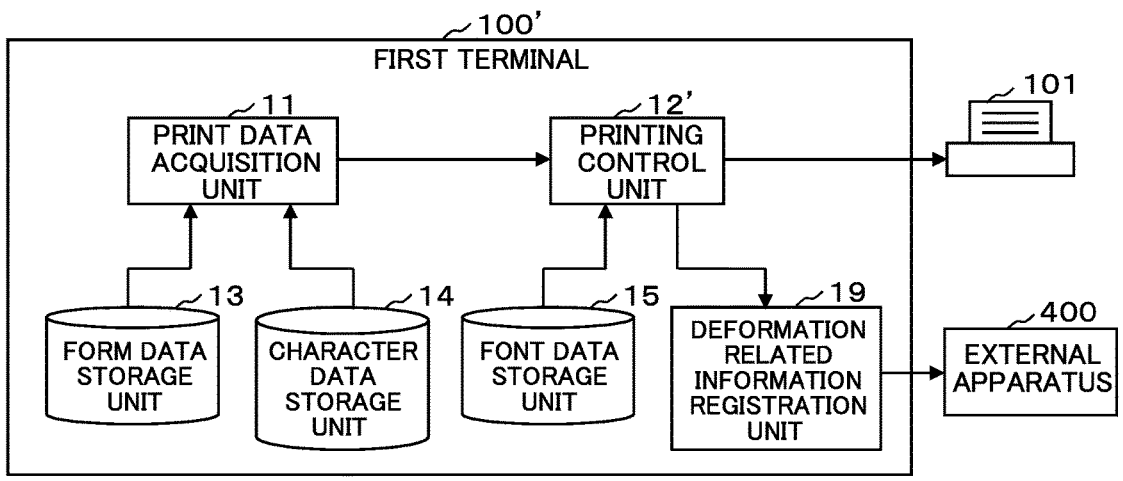
FIG. 7 is a block diagram illustrating a functional configuration example of a first terminal according to a second embodiment.
Figure 8:
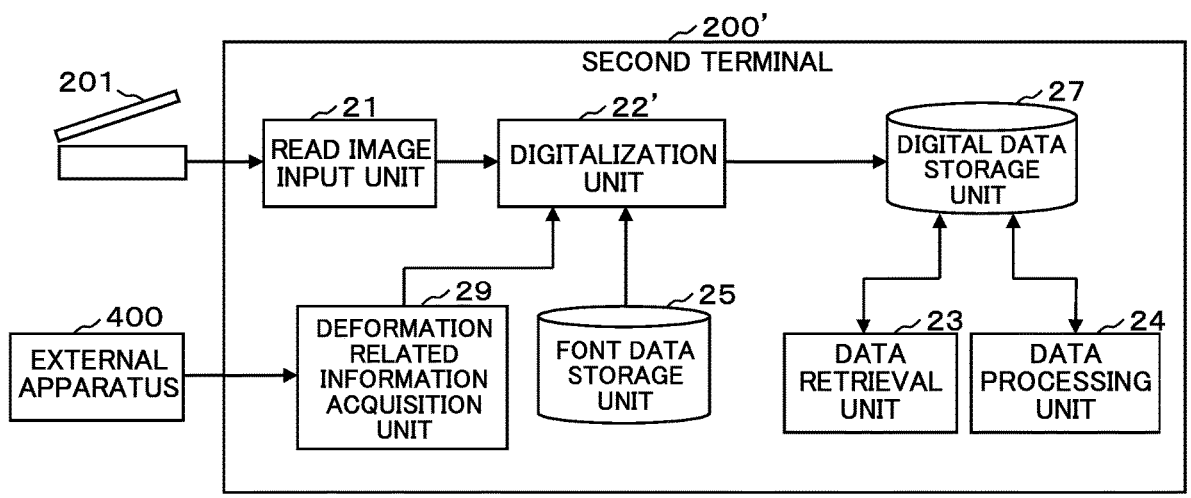
FIG. 8 is a block diagram illustrating a functional configuration example of a second terminal according to the second embodiment.

FIG. 7 is a block diagram illustrating a functional configuration example of the first terminal 100' according to the second embodiment. FIG. 8 is a block diagram illustrating a functional configuration example of the second terminal 200' according to the second embodiment. Note that, in FIG. 7 and FIG. 8, constituent elements to which the same reference numerals as in FIG. 2 and FIG. 4 are given have the same function, and thus redundant description will be omitted here.

As illustrated in FIG. 7, the first terminal 100' includes a printing control unit 12' instead of the printing control unit 12, and includes a deformation related information registration unit 19 instead of the deformation related information storage unit 16. In addition, as illustrated in FIG. 8, the second terminal 200' includes a digitalization unit 22' instead of the digitalization unit 22, and includes a deformation related information acquisition unit 29 instead of the deformation related information storage unit 26.

When performing printing on the basis of character data included in print data acquired by the print data acquisition unit 11, the printing control unit 12' of the first terminal 100' performs control so that printing is performed in a state in which arbitrary deformation is made with respect to a character shape expressed by a designation font.

The deformation related information registration unit 19 associates the content of the character shape deformation made on the basis of the control by the printing control unit 12' with meta information acquired with respect to character data that is set as a target of the character shape deformation to generate deformation related information, and transmits the generated deformation related information to an external apparatus 400 for registration. Specifically, the deformation related information registration unit 19 transmits the content of the character shape deformation that is actually performed with respect to the character data by the printing control unit 12', and meta information corresponding to the character data to the external apparatus 400 that is connected to the first terminal 100' through a communication network such as a LAN and the Internet, and registers the transmitted information in a storage unit of the external apparatus 400 as deformation related information.

When the digitalization unit 22' recognizes character shape deformation with respect to the characters recorded on the printed matter 300, and generates meta information corresponding to the recognized deformation, the deformation related information acquisition unit 29 of the second terminal 200' acquires the deformation related information registered in a storage unit of the external apparatus 400. The digitalization unit 22' generates meta information that is associated with the recognized character shape deformation with reference to the deformation related information acquired by the deformation related information acquisition unit 29.

According to the second embodiment configured as described above, it is not necessary to store the deformation related information in the deformation related information storage unit 16 or 26 by generating the deformation related information in advance as in the first embodiment, and arbitrary character shape deformation that is performed in execution of printing is associated with the meta information in real time to generate the deformation related information, and the deformation related information can be shared by the first terminal 100' and the second terminal 200'.

Note that, in the above-described second embodiment, description has been given of a configuration which is illustrated in FIG. 7 and FIG. 8 as a modification with respect to FIG. 2 and FIG. 4, and in which variable print data including form data (including meta information) and character data is used as the print data, but the invention is not limited thereto. That is, the second embodiment is also applicable to a configuration in which the integrated data is used as the print data as in FIG. 5. In addition, the second embodiment is also applicable to a configuration in which the structured data is used as the print data as in FIG. 6.

In the case of using the variable print data including the form data and the character data, meta information is defined in advance for every field of the print form. Accordingly, as illustrated in FIG. 2 and FIG. 4, predetermined character shape deformation is determined in advance with respect to meta information that is known in advance, and deformation related information can be generated in advance and can be stored in the deformation related information storage unit 16 or 26.

In contrast, in the case of using the integrated data as the print data, since character data having arbitrary meaning may be included in an arbitrary location, character data that is an execution target of character shape deformation and meta information corresponding to the character data may not be known in advance in many cases. In the case of the structured data, a data item may be used as the meta information, but the data item is not known in advance as in the form data. Accordingly, the second embodiment is particularly effective for the case of using the integrated data or the structured data as the print data.

Note that, in the second embodiment, description has been given of an example in which the deformation related information is registered in the storage unit of the external apparatus 400, but in a case where one terminal has a function of the first terminal 100' and a function of the second terminal 200', the deformation related information may be registered in a storage unit of the one terminal.

In addition, each of the first and second embodiments is merely an example of embodiment of the invention, and it should be understood that the technical scope of the invention is not interpreted in a limited manner by the first and second embodiments. That is, the invention can be implemented in various aspects without departing from the gist of the invention or a main feature of the invention.

What is claimed is:

1. A meta information transmission system through a printed matter, comprising:
   a print data acquisition unit that acquires print data including at least character data;
   a printing control unit that performs control relating to execution of printing by using the print data;
   a read image input unit that inputs a read image of a printed matter created by printing based on control by the printing control unit; and
   a digitalization unit that generates digital data including character data corresponding to characters recorded on the printed matter on the basis of the read image,
   wherein when performing printing on the basis of the character data included in the print data, the printing control unit performs control so that printing is performed in a state in which deformation is made with respect to a character shape expressed by a designation font in association with meta information that is meta information acquired on the basis of the print data and indicates meaning of characters expressed by the character data, and when converting the characters recorded on the printed matter into digital character data, the digitalization unit recognizes character shape deformation with respect to the characters recorded on the printed matter, and generates meta information corresponding to the recognized deformation with reference to deformation related information stored in a state in which a content of the character shape deformation and a content of the meta information are associated with each other to generate digital data including the meta information in addition to the character data.

2. The meta information transmission system through a printed matter according to claim 1, wherein the print data is variable print data including form data relating to a print form and character data that is inserted into the print form, and the form data includes the meta information, and when performing printing by inserting the character data into one or more fields provided in the print form, the printing control unit performs control so that printing is performed in a state in which deformation is made with respect to a character shape expressed by a designation font with respect to the character data inserted into the one or more fields in association with the meta information provided in the form data in correspondence with each of the one or more fields.

3. The meta information transmission system through a printed matter according to claim 1, wherein the print data is integrated data including one or more pieces of character data and another data relating to another information to be printed, and includes the meta information in accompaniment with the integrated data, and when performing printing on the basis of the character data included in the integrated data, the printing control unit performs control so that printing is performed in a state in which deformation is made with respect to a character shape expressed by a designation font for the one or more pieces of character data in association with the meta information corresponding to the character data.

4. The meta information transmission system through a printed matter according to claim 1, wherein the print data is structured data including a data item corresponding to meta information indicating meaning of characters expressed by the character data, and the character data equivalent to an actual data value corresponding to the data item, and when performing printing on the basis of the character data included in the structured data, the printing control unit performs control so that printing is performed in a state in which deformation is made with respect to a character shape expressed by a designation font for one or more pieces of character data pertaining to the data item in association with the meta information indicated by the data item.

5. The meta information transmission system through a printed matter according to claim 1, further comprising:

a deformation related information storage unit that stores in advance deformation related information composed by associating a content of the meta information and a content of character shape deformation to be made in correspondence with the content of the meta information, wherein when performing printing on the basis of the character data included in the print data, the printing control unit performs control so that printing is performed in a state in which character shape deformation associated with the meta information is made with respect to the character shape expressed by the designation font with reference to the deformation related information stored in the deformation related information storage unit, and when recognizing the character shape deformation with respect to characters recorded on the printed matter and generating meta information corresponding to the recognized deformation, the digitalization unit generates meta information associated with the recognized deformation with reference to the deformation related information stored in the deformation related information storage unit.

6. The meta information transmission system through a printed matter according to claim 1, further comprising:

a deformation related information registration unit that associates a content of character shape deformation made when performing printing on the basis of the character data included in the print data and a content of the meta information acquired on the basis of the print data with each other, and registers the content of the character shape deformation and the content of the meta information in a storage unit as deformation related information, when performing printing on the basis of the character data included in the print data, the printing control unit performs control so that printing is performed in a state in which arbitrary deformation is made with respect to a character shape expressed by the designation font, the deformation related information registration unit associates a content of the character shape deformation made on the basis of the control by the printing control unit with meta information acquired with respect to character data that is set as a target of the character shape deformation, and registers the resultant information in the storage unit as the deformation related information, and when recognizing character shape deformation with respect to characters recorded on the printed matter and generating meta information corresponding to the recognized deformation, the digitalization unit generates meta information associated with the recognized deformation with reference to deformation related information registered in the storage unit.

7. The meta information transmission system through a printed matter according to claim 1, further comprising:

a data processing unit that performs data processing by using the digital data generated by the digitalization unit to generate new digital data, wherein the data processing unit generates meta information corresponding to character data included in the new digital data by using the meta information included in the digital data.

8. The meta information transmission system through a printed matter according to claim 7, wherein the print data acquisition unit acquires the new digital data generated by the data processing unit as the print data.

9. The meta information transmission system through a printed matter according to claim 1, wherein the deformation made with respect to the character shape expressed by the designation font by the printing control unit is minute deformation to a certain extent that is not easily recognized for a person who visually observes the printed matter.

10. The meta information transmission system through a printed matter according to claim 1, further comprising:
a data processing unit that performs data processing by using the digital data generated by the digitalization unit to generate new digital data,
wherein the data processing unit generates meta information corresponding to character data included in the new digital data by using the meta information included in the digital data.

11. The meta information transmission system through a printed matter according to claim 2, further comprising:
a deformation related information storage unit that stores in advance deformation related information composed by associating a content of the meta information and a content of character shape deformation to be made in correspondence with the content of the meta information,
wherein when performing printing on the basis of the character data included in the print data, the printing control unit performs control so that printing is performed in a state in which character shape deformation associated with the meta information is made with respect to the character shape expressed by the designation font with reference to the deformation related information stored in the deformation related information storage unit, and
when recognizing the character shape deformation with respect to characters recorded on the printed matter and generating meta information corresponding to the recognized deformation, the digitalization unit generates meta information associated with the recognized deformation with reference to the deformation related information stored in the deformation related information storage unit.

12. The meta information transmission system through a printed matter according to claim 2, further comprising:
a deformation related information registration unit that associates a content of character shape deformation made when performing printing on the basis of the character data included in the print data and a content of the meta information acquired on the basis of the print data with each other, and registers the content of the character shape deformation and the content of the meta information in a storage unit as deformation related information,
when performing printing on the basis of the character data included in the print data, the printing control unit performs control so that printing is performed in a state in which arbitrary deformation is made with respect to a character shape expressed by the designation font,
the deformation related information registration unit associates a content of the character shape deformation made on the basis of the control by the printing control unit with meta information acquired with respect to character data that is set as a target of the character shape deformation, and registers the resultant information in the storage unit as the deformation related information, and
when recognizing character shape deformation with respect to characters recorded on the printed matter and generating meta information corresponding to the recognized deformation, the digitalization unit generates meta information associated with the recognized deformation with reference to deformation related information registered in the storage unit.

13. The meta information transmission system through a printed matter according to claim 3, further comprising:
a deformation related information storage unit that stores in advance deformation related information composed by associating a content of the meta information and a content of character shape deformation to be made in correspondence with the content of the meta information,
wherein when performing printing on the basis of the character data included in the print data, the printing control unit performs control so that printing is performed in a state in which character shape deformation associated with the meta information is made with respect to the character shape expressed by the designation font with reference to the deformation related information stored in the deformation related information storage unit, and
when recognizing the character shape deformation with respect to characters recorded on the printed matter and generating meta information corresponding to the recognized deformation, the digitalization unit generates meta information associated with the recognized deformation with reference to the deformation related information stored in the deformation related information storage unit.

14. The meta information transmission system through a printed matter according to claim 3, further comprising:
a deformation related information registration unit that associates a content of character shape deformation made when performing printing on the basis of the character data included in the print data and a content of the meta information acquired on the basis of the print data with each other, and registers the content of the character shape deformation and the content of the meta information in a storage unit as deformation related information,
when performing printing on the basis of the character data included in the print data, the printing control unit performs control so that printing is performed in a state in which arbitrary deformation is made with respect to a character shape expressed by the designation font,
the deformation related information registration unit associates a content of the character shape deformation made on the basis of the control by the printing control unit with meta information acquired with respect to character data that is set as a target of the character shape deformation, and registers the resultant information in the storage unit as the deformation related information, and
when recognizing character shape deformation with respect to characters recorded on the printed matter and generating meta information corresponding to the recognized deformation, the digitalization unit generates meta information associated with the recognized deformation with reference to deformation related information registered in the storage unit.

15. The meta information transmission system through a printed matter according to claim 4, further comprising:
a deformation related information storage unit that stores in advance deformation related information composed by associating a content of the meta information and a content of character shape deformation to be made in correspondence with the content of the meta information, wherein when performing printing on the basis of the character data included in the print data, the printing control unit performs control so that printing is performed in a state in which character shape deformation associated with the meta information is made with respect to the character shape expressed by the designation font with reference to the deformation related information stored in the deformation related information storage unit, and when recognizing the character shape deformation with respect to characters recorded on the printed matter and generating meta information corresponding to the recognized deformation, the digitalization unit generates meta information associated with the recognized deformation with reference to the deformation related information stored in the deformation related information storage unit.

16. The meta information transmission system through a printed matter according to claim 4, further comprising:

a deformation related information registration unit that associates a content of character shape deformation made when performing printing on the basis of the character data included in the print data and a content of the meta information acquired on the basis of the print data with each other, and registers the content of the character shape deformation and the content of the meta information in a storage unit as deformation related information, when performing printing on the basis of the character data included in the print data, the printing control unit performs control so that printing is performed in a state in which arbitrary deformation is made with respect to a character shape expressed by the designation font, the deformation related information registration unit associates a content of the character shape deformation made on the basis of the control by the printing control unit with meta information acquired with respect to character data that is set as a target of the character shape deformation, and registers the resultant information in the storage unit as the deformation related information, and when recognizing character shape deformation with respect to characters recorded on the printed matter and generating meta information corresponding to the recognized deformation, the digitalization unit generates meta information associated with the recognized deformation with reference to deformation related information registered in the storage unit.

17. A printed matter reading apparatus, comprising:

a read image input unit that inputs a read image of a printed matter created by printing based on control by a printing control apparatus;

a digitalization unit that generates digital data including character data corresponding to characters recorded on the printed matter on the basis of the read image; and the printing control apparatus comprising:

a print data acquisition unit that acquires print data including at least character data; and a printing control unit that performs control relating to printing execution by using the print data, and performs control so that printing is performed in a state in which deformation is made with respect to a character shape expressed by a designation font in association with meta information that is meta information acquired on the basis of the print data and indicates meaning of characters expressed by the character data when performing printing on the basis of the character data included in the print data;

wherein when converting the characters recorded on the printed matter into digital character data, the digitalization unit recognizes character shape deformation with respect to the characters recorded on the printed matter, and generates meta information corresponding to the recognized deformation with reference to deformation related information stored in a state in which a content of the character shape deformation and a content of the meta information are associated with each other to generate digital data including the meta information in addition to the character data.

18. A method for acquiring meta information from a printed matter, comprising:

causing a read image input unit of a printed matter reading apparatus to input a read image of a printed matter created by printing based on control by a printing control apparatus;

causing a digitalization unit of the printed matter reading apparatus to generate digital data including character data corresponding to characters recorded on the printed matter on the basis of the read image, wherein when converting the characters recorded on the printed matter into digital character data, the digitalization unit recognizes character shape deformation with respect to the characters recorded on the printed matter, and generates meta information corresponding to the recognized deformation with reference to deformation related information stored in a state in which a content of the character shape deformation and a content of the meta information are associated with each other to generate digital data including the meta information in addition to the character data;

wherein the printing control apparatus comprises:

a print data acquisition unit that acquires print data including at least character data; and a printing control unit that performs control relating to printing execution by using the print data, and performs control so that printing is performed in a state in which deformation is made with respect to a character shape expressed by a designation font in association with meta information that is meta information acquired on the basis of the print data and indicates meaning of characters expressed by the character data when performing printing on the basis of the character data included in the print data.

* * * * *